United States Patent
Khoshnevisan et al.

(10) Patent No.: US 11,044,064 B2
(45) Date of Patent: Jun. 22, 2021

(54) DETERMINING HYBRID AUTOMATIC REPEAT REQUEST (HARQ) PROCESSES FOR MULTI-TRANSMIT RECEIVE POINT (TRP)

(71) Applicant: QUALCOMM Incorporated, San Diego, CA (US)

(72) Inventors: Mostafa Khoshnevisan, San Diego, CA (US); Seyedkianoush Hosseini, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 16/593,722

(22) Filed: Oct. 4, 2019

(65) Prior Publication Data

US 2020/0112414 A1    Apr. 9, 2020

Related U.S. Application Data

(60) Provisional application No. 62/742,878, filed on Oct. 8, 2018.

(51) Int. Cl.
*H04W 72/04* (2009.01)
*H04L 5/00* (2006.01)
*H04L 1/18* (2006.01)

(52) U.S. Cl.
CPC .......... *H04L 5/0055* (2013.01); *H04L 1/1812* (2013.01); *H04L 5/001* (2013.01);
(Continued)

(58) Field of Classification Search
CPC ............. H04W 72/042; H04W 72/048; H04W 72/044; H04L 5/0035; H04L 5/0055; H04L 5/001; H04L 1/1812
See application file for complete search history.

(56) References Cited

U.S. PATENT DOCUMENTS

2011/0158116 A1* 6/2011 Tenny ............... H04W 56/0045
370/252
2017/0332359 A1* 11/2017 Tsai ..................... H04B 7/0639
(Continued)

FOREIGN PATENT DOCUMENTS

WO      2018141246 A1    8/2018

OTHER PUBLICATIONS

Huawei et al: "Solution and TP for Multi-TRP PDCCH Transmission," 3GPP DRAT; R1-1800824, 3rd Generation Partnership Project (3GPP), Mobile Competence Centre; 650, Route Des Lucioles; F-06921 Sophia-Antipolis Cedex; France, vol. RAN WG1, No. Vancouver, Canada; Jan. 22, 2018-Jan. 26, 2018, Jan. 13, 2018, XP051385096, 5 pages, Retrieved from the Internet: URL: http://www.3gpp.org/ftp/tsg%5Fran/WG1%5FRL1/TSGR1%5FAH/NR%5FAH%5F1801/Docs/ [retrieved on Jan. 13, 2018] p. 3.

(Continued)

*Primary Examiner* — Wei Zhao
(74) *Attorney, Agent, or Firm* — Harrity & Harrity, LLP

(57) ABSTRACT

Various aspects of the present disclosure generally relate to wireless communication. In some aspects, a user equipment may determine a control resource set (CORESET) associated with decoded downlink control information (DCI) or a search space associated with the decoded DCI. The user equipment may determine a transmit receive point (TRP) differentiation between TRPs associated with a multi-TRP mode based at least in part on the CORESET associated with the decoded DCI or the search space associated with the decoded DCI. Numerous other aspects are provided.

27 Claims, 16 Drawing Sheets

(52) U.S. Cl.
CPC ......... *H04L 5/0035* (2013.01); *H04W 72/042* (2013.01); *H04W 72/044* (2013.01); *H04W 72/048* (2013.01)

(56) References Cited

U.S. PATENT DOCUMENTS

2017/0366311 A1* 12/2017 Iyer .................. H04L 1/0026
2018/0145819 A1*  5/2018 Axmon ............... H04W 4/70
2020/0196343 A1*  6/2020 Marinier ............. H04L 1/1854

OTHER PUBLICATIONS

International Search Report and Written Opinion—PCT/US2019/055007—ISA/EPO—dated May 14, 2020.
Huawei et al., "CORESET Configuration and Search Space Design", 3GPP Draft; R1-1719387, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017 Nov. 18, 2017, XP051369296, Retrieved from the Internet: URL:http://www.3gpp.org/ftp/tsg%5Fran/WG1%5FRL1/TSGR1%5F91/Docs/ [retrieved on Nov. 18, 2017], 12 pages.
Interdigital Inc: "DCI Design for Multi-TRP/Panel Transmission for DL", 3GPP Draft, R1-1714138 DCI Design for Multi-TRP Panel Transmission for DL, 3rd Generation Partnership Project (3GPP), Mobile Competence Centre, 650, Route Des Lucioles, F-06921 Sophia-Antipolis Cede, vol. RAN WG1, No. Prague, Czech Republic, Aug. 21, 2017-Aug. 25, 2017, Aug. 20, 2017 (Aug. 20, 2017), XP051316927, 3 Pages, Retrieved from the Internet: URL:http://www.3gpp.org/ftp/Meetings_3GPP_SYNC/RAN1/Docs/ [retrieved on Aug. 20, 2017], Section 2.
Partial International Search Report—PCT/US2019/055007—ISA/EPO—dated Jan. 17, 2020.
Abbas S.S., et al., "Novel Receiver Architecture for LTE-A Downlink Physical Control Format Indicator Channel with Diversity", VLSI Design, vol. 2014, Dec. 1, 2014, 15 Pages.
Baker M., et al., "Chapter 9—Downlink Physical Data and Control Channels", in LTE—The UMTS Long Term Evolution: From Theory to Practice, John Wiley & Sons, 2011, 189-214, ISBN: 978-0-470-69716-0.
Cohen R., et al., "Cross-Layer Hybrid FEC/ARQ Reliable Multicast With Adaptive Modulation and Coding in Broadband Wireless Networks", IEEE/ACM Transactions on Networking, vol. 8, No. 6, Dec. 2010, 14 Pages.
Cox C., et al., "Data Transmission and Reception", An Introduction to LTE, 2014, pp. 135-162.
Valluri K.A., et al., "Procoder Detection for Cooperative Decode-and-Forward Relaying in OFDMA Systems", 2016, 8 Pages.

* cited by examiner

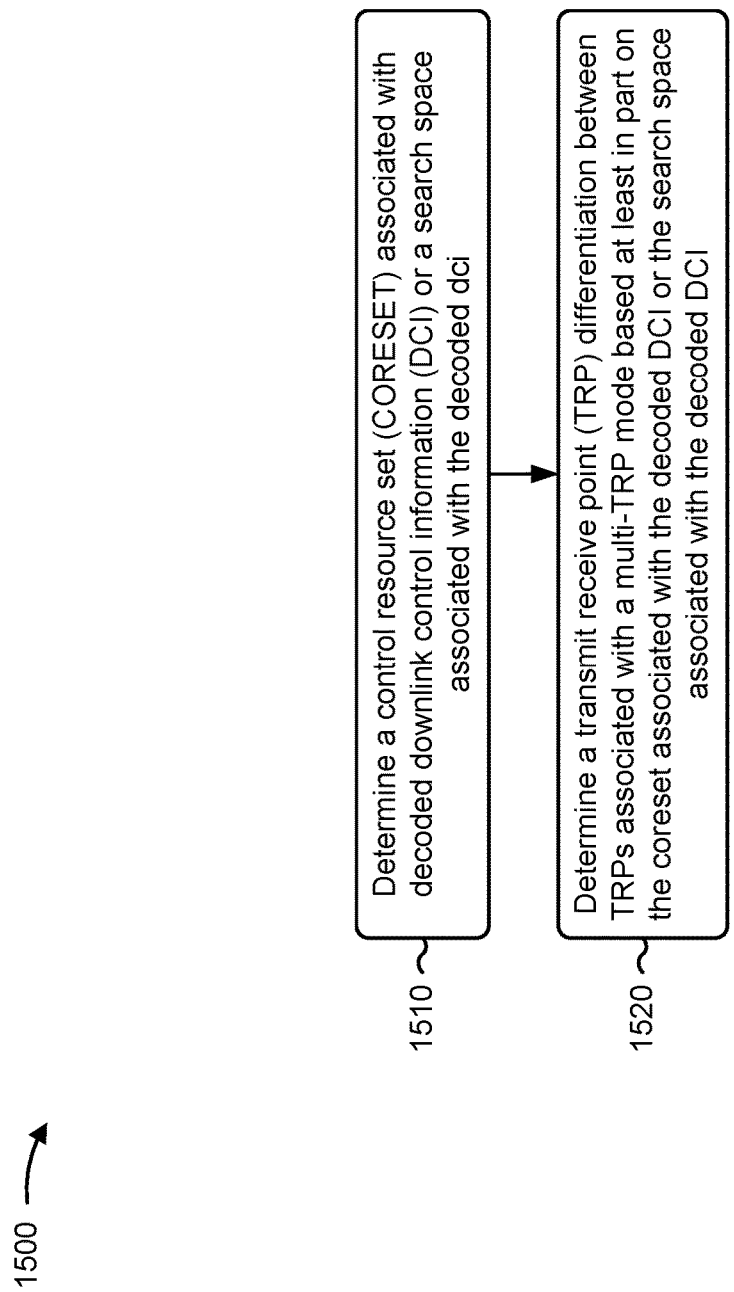

DETERMINING HYBRID AUTOMATIC REPEAT REQUEST (HARQ) PROCESSES FOR MULTI-TRANSMIT RECEIVE POINT (TRP)

CROSS-REFERENCE TO RELATED APPLICATION

This application claims priority to U.S. Provisional Patent Application No. 62/742,878, filed Oct. 8, 2018, entitled "DETERMINING HYBRID AUTOMATIC REPEAT REQUEST (HARQ) PROCESSES FOR MULTI-TRANSMIT RECEIVE POINT (TRP)," which is hereby expressly incorporated by reference herein.

FIELD OF THE DISCLOSURE

Aspects of the present disclosure generally relate to wireless communication and to techniques and apparatuses for determining hybrid automatic repeat request (HARQ) processes for multi-transmit receive point (TRP).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining a control resource set (CORESET) associated with decoded downlink control information (DCI) or a search space associated with the decoded DCI; and determining a transmit receive point (TRP) differentiation between TRPs associated with a multi-TRP mode based at least in part on the CORESET associated with the decoded DCI or the search space associated with the decoded DCI.

In some aspects, a UE for wireless communication may include memory and one or more processors operatively coupled to the memory. The memory and the one or more processors may be configured to determine a CORESET associated with decoded DCI or a search space associated with the decoded DCI; and determine a TRP differentiation between TRPs associated with a multi-TRP mode based at least in part on the CORESET associated with the decoded DCI or the search space associated with the decoded DCI.

In some aspects, a non-transitory computer-readable medium may store one or more instructions for wireless communication. The one or more instructions, when executed by one or more processors of a UE, may cause the one or more processors to determine a CORESET associated with decoded DCI or a search space associated with the decoded DCI; and determine a TRP differentiation between TRPs associated with a multi-TRP mode based at least in part on the CORESET associated with the decoded DCI or the search space associated with the decoded DCI.

In some aspects, an apparatus for wireless communication may include means for determining a CORESET associated with decoded DCI or a search space associated with the decoded DCI; and means for determining a TRP differentiation between TRPs associated with a multi-TRP mode based at least in part on the CORESET associated with the decoded DCI or the search space associated with the decoded DCI.

In some aspects, a method of wireless communication, performed by a user equipment (UE), may include receiving, from a base station (BS), a hybrid automatic repeat request (HARQ) configuration for a multi-transmit receive point (TRP) mode, wherein the HARQ configuration for the multi-TRP mode is based at least in part on: a quantity of component carriers (CCs) reported by the UE, or a quantity of HARQ processes that the UE is capable of using; and determining, after receiving the HARQ configuration, a TRP differentiation between TRPs associated with the multi-TRP mode based at least in part on at least one of: a control resource set (CORESET) associated with decoded downlink control information (DCI), or a search space associated with the decoded DCI.

In some aspects, a UE for wireless communication may include memory and one or more processors operatively coupled to the memory. The memory and the one or more processors may be configured to receive, from a BS, a HARQ configuration for a multi-TRP mode, wherein the HARQ configuration for the multi-TRP mode is based at least in part on: a quantity of CCs reported by the UE, or a quantity of HARQ processes that the UE is capable of using; and determine, after receiving the HARQ configuration, a TRP differentiation between TRPs associated with the multi-TRP mode based at least in part on at least one of: a CORESET associated with decoded DCI, or a search space associated with the decoded DCI.

In some aspects, a non-transitory computer-readable medium may store one or more instructions for wireless communication. The one or more instructions, when executed by one or more processors of a user equipment, may cause the one or more processors to receive, from a BS, a HARQ configuration for a multi-TRP mode, wherein the HARQ configuration for the multi-TRP mode is based at least in part on: a quantity of CCs reported by the UE, or a quantity of HARQ processes that the UE is capable of using; and determine, after receiving the HARQ configuration, a TRP differentiation between TRPs associated with the multi-TRP mode based at least in part on at least one of: a CORESET associated with decoded DCI, or a search space associated with the decoded DCI.

In some aspects, an apparatus for wireless communication may include means for receiving, from a BS, a HARQ configuration for a multi-TRP mode, wherein the HARQ configuration for the multi-TRP mode is based at least in part on: a quantity of CCs reported by the UE, or a quantity of HARQ processes that the UE is capable of using; and determining, after receiving the HARQ configuration, a TRP differentiation between TRPs associated with the multi-TRP mode based at least in part on at least one of: a CORESET associated with decoded DCI, or a search space associated with the decoded DCI.

In some aspects, a method of wireless communication, performed by a UE, may include determining, for a UE, a HARQ configuration for a multi-TRP mode, wherein the HARQ configuration for the multi-TRP mode is based at least in part on: a quantity of CCs reported by the UE, or a quantity of HARQ processes that the UE is capable of using; and transmitting, to the UE, the HARQ configuration based at least in part on determining the HARQ configuration.

In some aspects, a user equipment for wireless communication may include memory and one or more processors operatively coupled to the memory. The memory and the one or more processors may be configured to determine, for a UE, a HARQ configuration for a multi-TRP mode, wherein the HARQ configuration for the multi-TRP mode is based at least in part on: a quantity of CCs reported by the UE, or a quantity of HARQ processes that the UE is capable of using; and transmit, to the UE, the HARQ configuration based at least in part on determining the HARQ configuration.

In some aspects, a non-transitory computer-readable medium may store one or more instructions for wireless communication. The one or more instructions, when executed by one or more processors of a user equipment, may cause the one or more processors to determine, for a UE, a HARQ configuration for a multi-TRP mode, wherein the HARQ configuration for the multi-TRP mode is based at least in part on: a quantity of CCs reported by the UE, or a quantity of HARQ processes that the UE is capable of using; and transmit, to the UE, the HARQ configuration based at least in part on determining the HARQ configuration.

In some aspects, an apparatus for wireless communication may include means for determining, for a UE, a HARQ configuration for a multi-TRP mode, wherein the HARQ configuration for the multi-TRP mode is based at least in part on: a quantity of CCs reported by the UE, or a quantity of HARQ processes that the UE is capable of using; and transmitting, to the UE, the HARQ configuration based at least in part on determining the HARQ configuration.

In some aspects, a method of wireless communication, performed by a UE, may include receiving, from a BS, a HARQ configuration for a multi-TRP mode, wherein the HARQ configuration for the multi-TRP mode is based at least in part on: a capability of the UE, or a division of one or more HARQ processes associated with the HARQ configuration across one or more CCs and one or more TRPs associated with the multi-TRP mode; and determining, after receiving the HARQ configuration, a TRP differentiation between the one or more TRPs associated with the multi-TRP mode based at least in part on a respective identifier for the one or more HARQ processes.

In some aspects, a user equipment for wireless communication may include memory and one or more processors operatively coupled to the memory. The memory and the one or more processors may be configured to receive, from a BS, a HARQ configuration for a multi-TRP mode, wherein the HARQ configuration for the multi-TRP mode is based at least in part on: a capability of the UE, or a division of one or more HARQ processes associated with the HARQ configuration across one or more CCs and one or more TRPs associated with the multi-TRP mode; and determine, after receiving the HARQ configuration, a TRP differentiation between the one or more TRPs associated with the multi-TRP mode based at least in part on a respective identifier for the one or more HARQ processes.

In some aspects, a non-transitory computer-readable medium may store one or more instructions for wireless communication. The one or more instructions, when executed by one or more processors of a user equipment, may cause the one or more processors to receive, from a BS, a HARQ configuration for a multi-TRP mode, wherein the HARQ configuration for the multi-TRP mode is based at least in part on: a capability of the UE, or a division of one or more HARQ processes associated with the HARQ configuration across one or more CCs and one or more TRPs associated with the multi-TRP mode; and determine, after receiving the HARQ configuration, a TRP differentiation between the one or more TRPs associated with the multi-TRP mode based at least in part on a respective identifier for the one or more HARQ processes.

In some aspects, an apparatus for wireless communication may include means for receiving, from a BS, a HARQ configuration for a multi-TRP mode, wherein the HARQ configuration for the multi-TRP mode is based at least in part on: a capability of the UE, or a division of one or more HARQ processes associated with the HARQ configuration across one or more CCs and one or more TRPs associated with the multi-TRP mode; and determining, after receiving the HARQ configuration, a TRP differentiation between the one or more TRPs associated with the multi-TRP mode based at least in part on a respective identifier for the one or more HARQ processes.

In some aspects, a method of wireless communication, performed by a UE, may include determining, for a UE, a HARQ configuration for a multi-TRP mode, wherein the HARQ configuration for the multi-TRP mode is based at least in part on: a capability of the UE, or a division of one or more HARQ processes associated with the HARQ configuration across one or more CCs and one or more TRPs associated with the multi-TRP mode; and transmitting, to the UE, the HARQ configuration based at least in part on determining the HARQ configuration.

In some aspects, a user equipment for wireless communication may include memory and one or more processors operatively coupled to the memory. The memory and the one or more processors may be configured to determine, for a UE, a HARQ configuration for a multi-TRP mode, wherein the HARQ configuration for the multi-TRP mode is based at least in part on: a capability of the UE, or a division of one or more HARQ processes associated with the HARQ configuration across one or more CCs and one or more TRPs associated with the multi-TRP mode; and transmit, to the UE, the HARQ configuration based at least in part on determining the HARQ configuration.

In some aspects, a non-transitory computer-readable medium may store one or more instructions for wireless communication. The one or more instructions, when executed by one or more processors of a user equipment, may cause the one or more processors to determine, for a UE, a HARQ configuration for a multi-TRP mode, wherein the HARQ configuration for the multi-TRP mode is based at least in part on: a capability of the UE, or a division of one or more HARQ processes associated with the HARQ configuration across one or more CCs and one or more TRPs associated with the multi-TRP mode; and transmit, to the UE, the HARQ configuration based at least in part on determining the HARQ configuration.

In some aspects, an apparatus for wireless communication may include means for determining, for a UE, a HARQ configuration for a multi-TRP mode, wherein the HARQ configuration for the multi-TRP mode is based at least in part on: a capability of the UE, or a division of one or more HARQ processes associated with the HARQ configuration across one or more CCs and one or more TRPs associated with the multi-TRP mode; and transmitting, to the UE, the HARQ configuration based at least in part on determining the HARQ configuration.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 15 is a diagram illustrating an example process performed, for example, by a user equipment, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
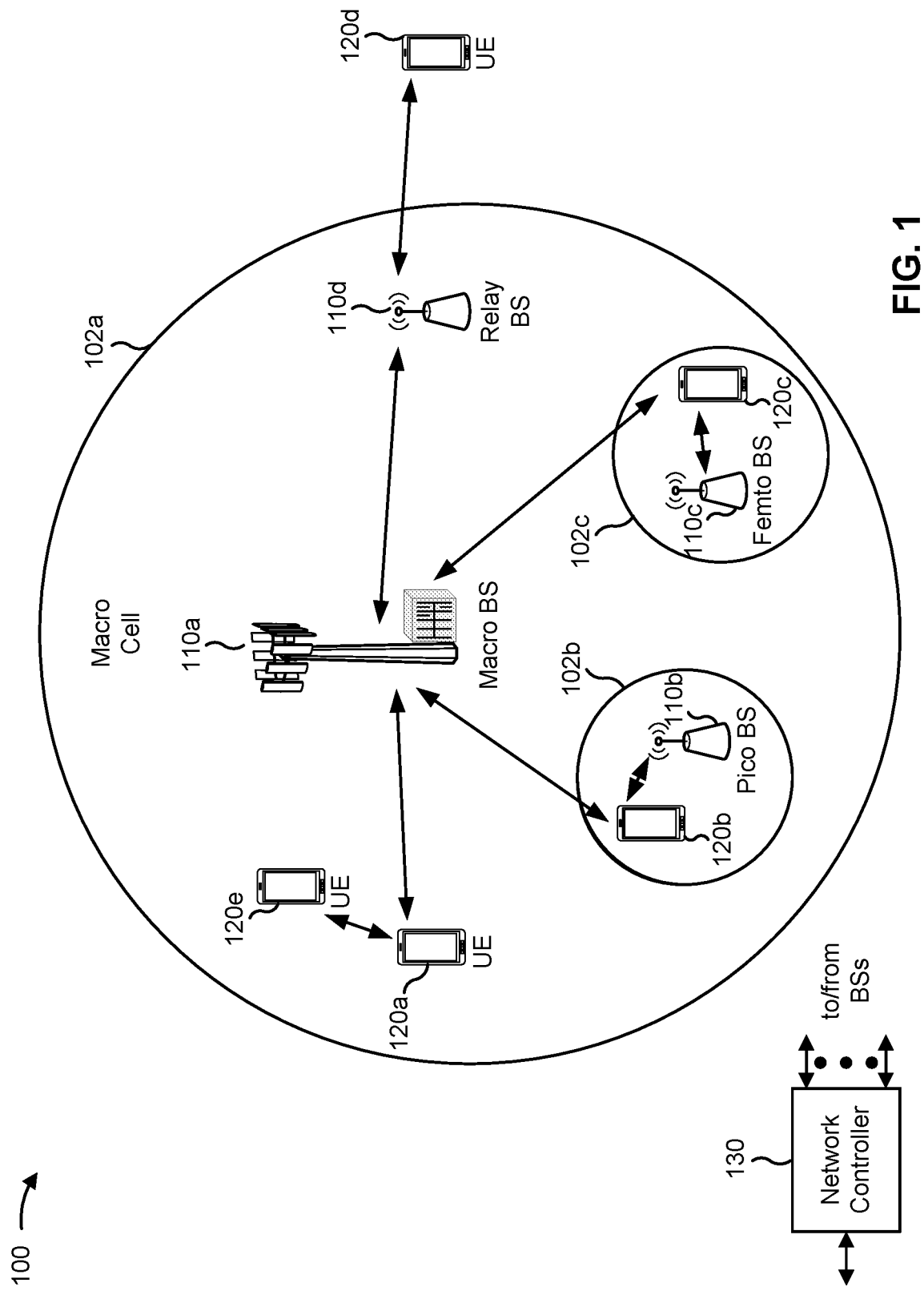
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
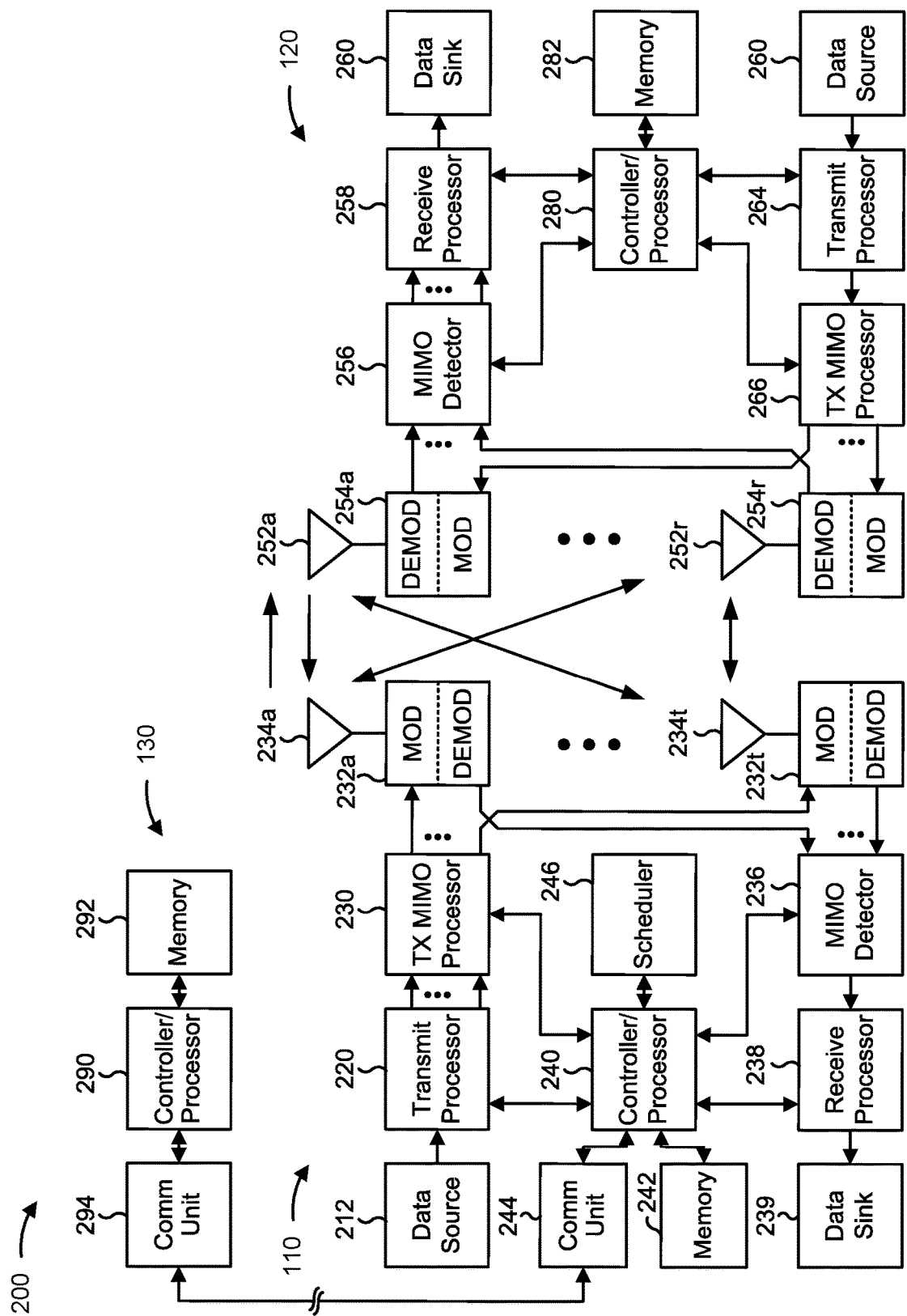
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with determining hybrid automatic repeat request (HARQ) processes for multi-transmit receive point (TRP), as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, process 1300 of FIG. 13, process 1400 of FIG. 14, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving, from a base station (BS), a HARQ configuration for a multi-transmit receive point (TRP) mode, wherein the HARQ configuration for the multi-TRP mode is based at least in part on: a quantity of component carriers (CCs) reported by the UE, or a quantity of HARQ processes that the UE is capable of using, means for determining, after receiving the HARQ configuration, a TRP differentiation between TRPs associated with the multi-TRP mode based at least in part on at least one of: a control resource set (CORESET) associated with decoded downlink control information (DCI), or a search space associated with the decoded DCI, means for receiving, from a BS, a HARQ configuration for a multi-TRP mode, wherein the HARQ configuration for the multi-TRP mode is based at least in part on: a capability of the UE, or a division of one or more HARQ processes associated with the HARQ configuration across one or more CCs and one or more TRPs associated with the multi-TRP mode, means for determining, after receiving the HARQ configuration, a TRP differentiation between the one or more TRPs associated with the multi-TRP mode based at least in part on a respective identifier for the one or more HARQ processes, and/or the like. Additionally, or alternatively, UE 120 may include means for determining a CORESET associated with decoded DCI or a search space associated with the decoded DCI; means for determining a TRP differentiation between TRPs associated with a multi-TRP mode based at least in part on the CORESET associated with the decoded DCI or the search space associated with the decoded DCI; and/or the like. In some aspects, such means may include one or more components of UE 120 described in connection with FIG. 2.

In some aspects, base station 110 may include means for determining, for a UE, a HARQ configuration for a multi-TRP mode, wherein the HARQ configuration for the multi-TRP mode is based at least in part on: a quantity of CCs reported by the UE, or a quantity of HARQ processes that the UE is capable of using, means for transmitting, to the UE, the HARQ configuration based at least in part on determining the HARQ configuration, means for determining, for a UE, a HARQ configuration for a multi-TRP mode, wherein the HARQ configuration for the multi-TRP mode is based at least in part on: a capability of the UE, or a division of one or more HARQ processes associated with the HARQ configuration across one or more CCs and one or more TRPs associated with the multi-TRP mode, and/or the like. In some aspects, such means may include one or more components of base station 110 described in connection with FIG. 2.

As indicated above, FIG. 2 is provided merely as an example. Other examples are possible and may differ from what was described with regard to FIG. 2.

Figure 3A:
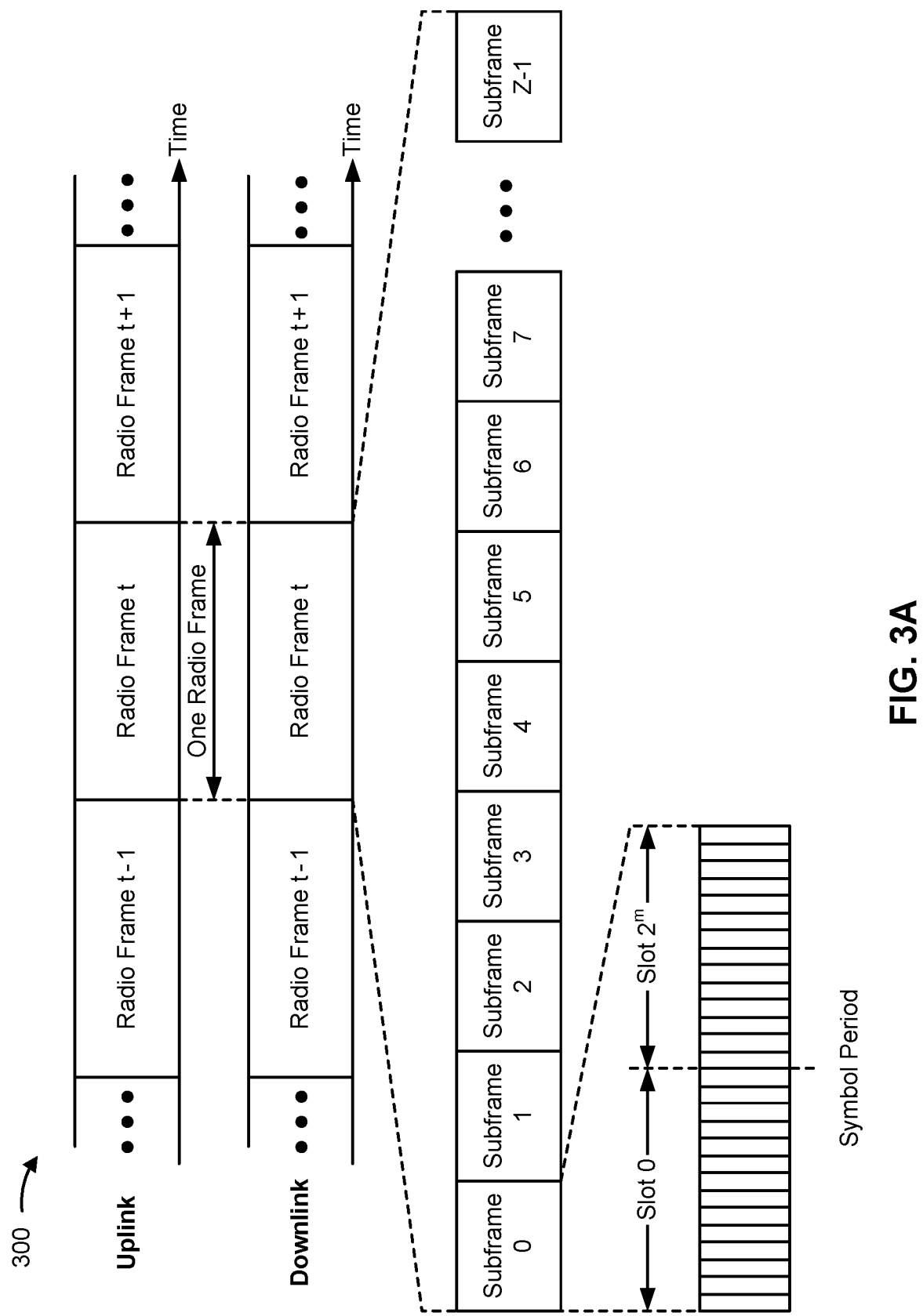
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
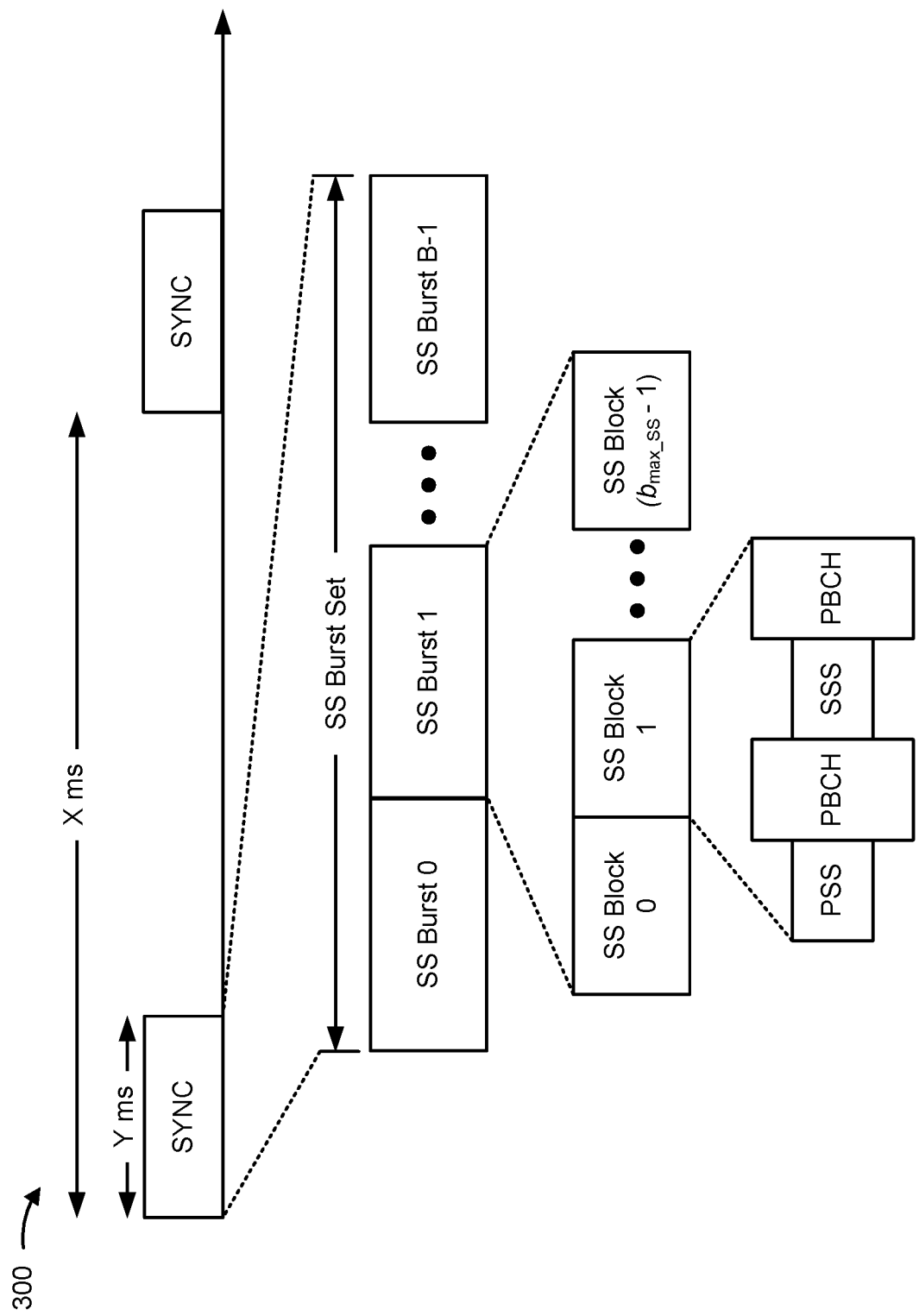
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where C may be configurable for each slot. The base station may transmit traffic data and/or other data on the PDSCH in the remaining symbol periods of each slot.

As indicated above, FIGS. 3A and 3B are provided as examples. Other examples are possible and may differ from what was described with regard to FIGS. 3A and 3B.

Figure 4:
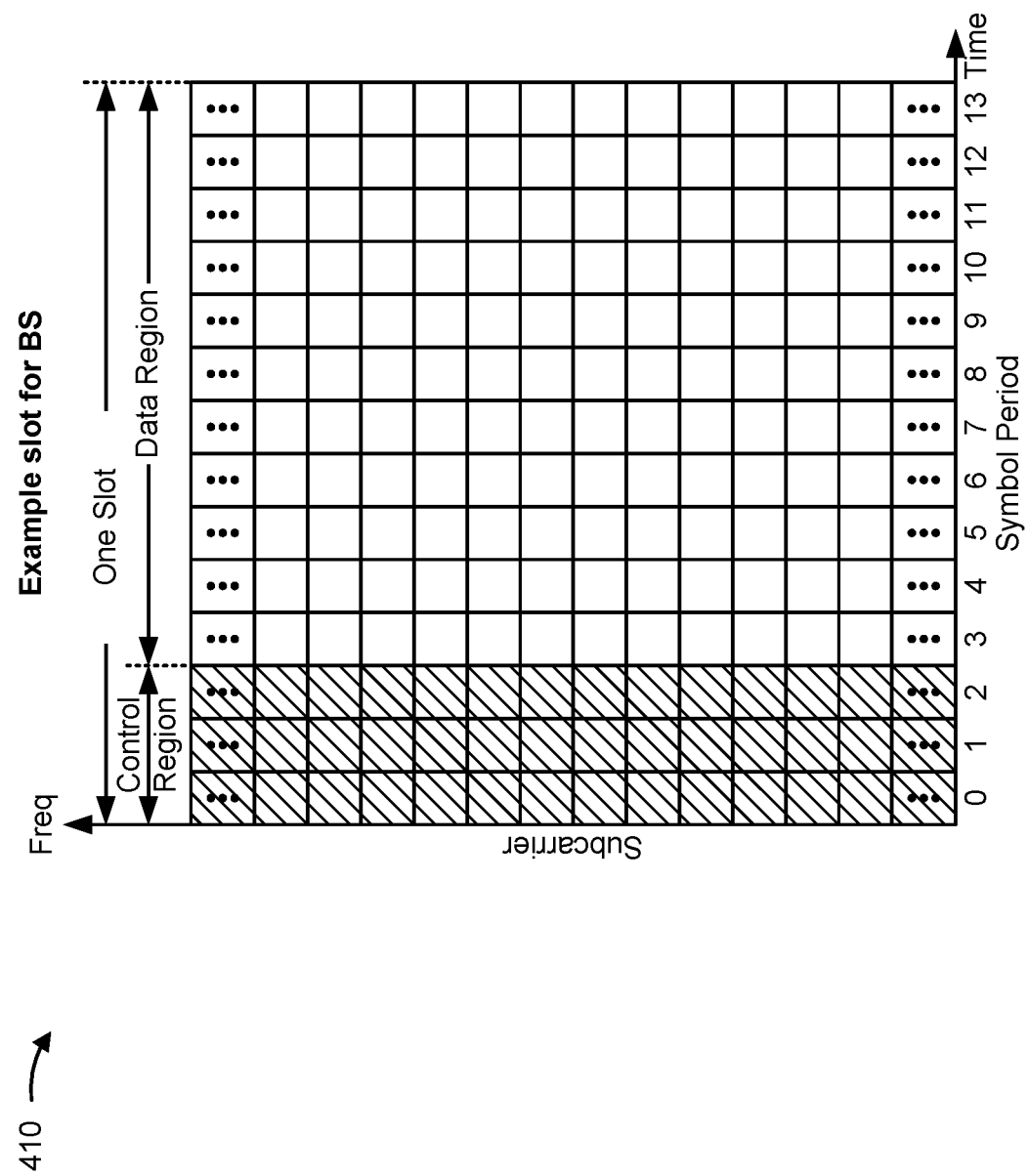
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

Figure 5:
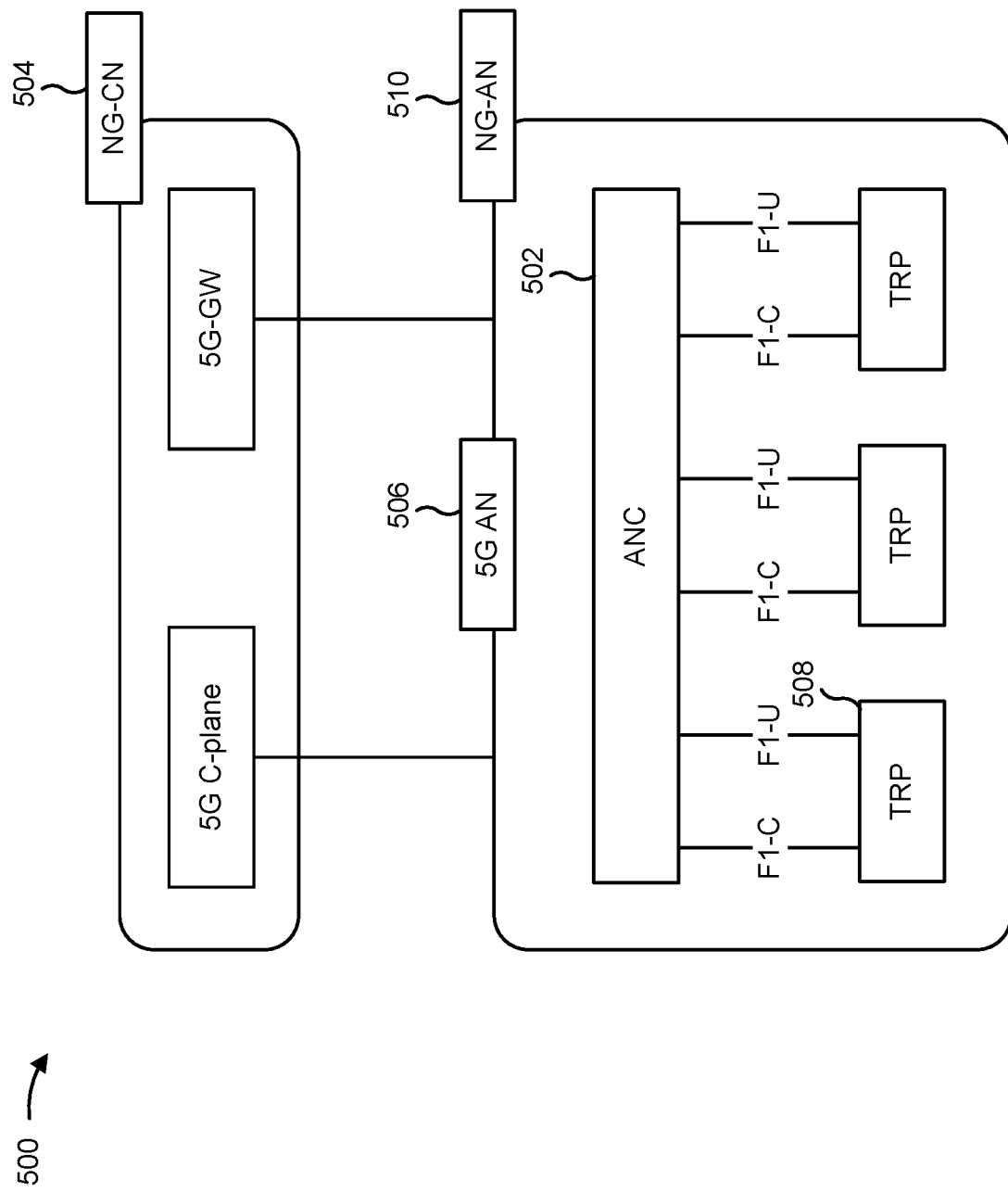
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
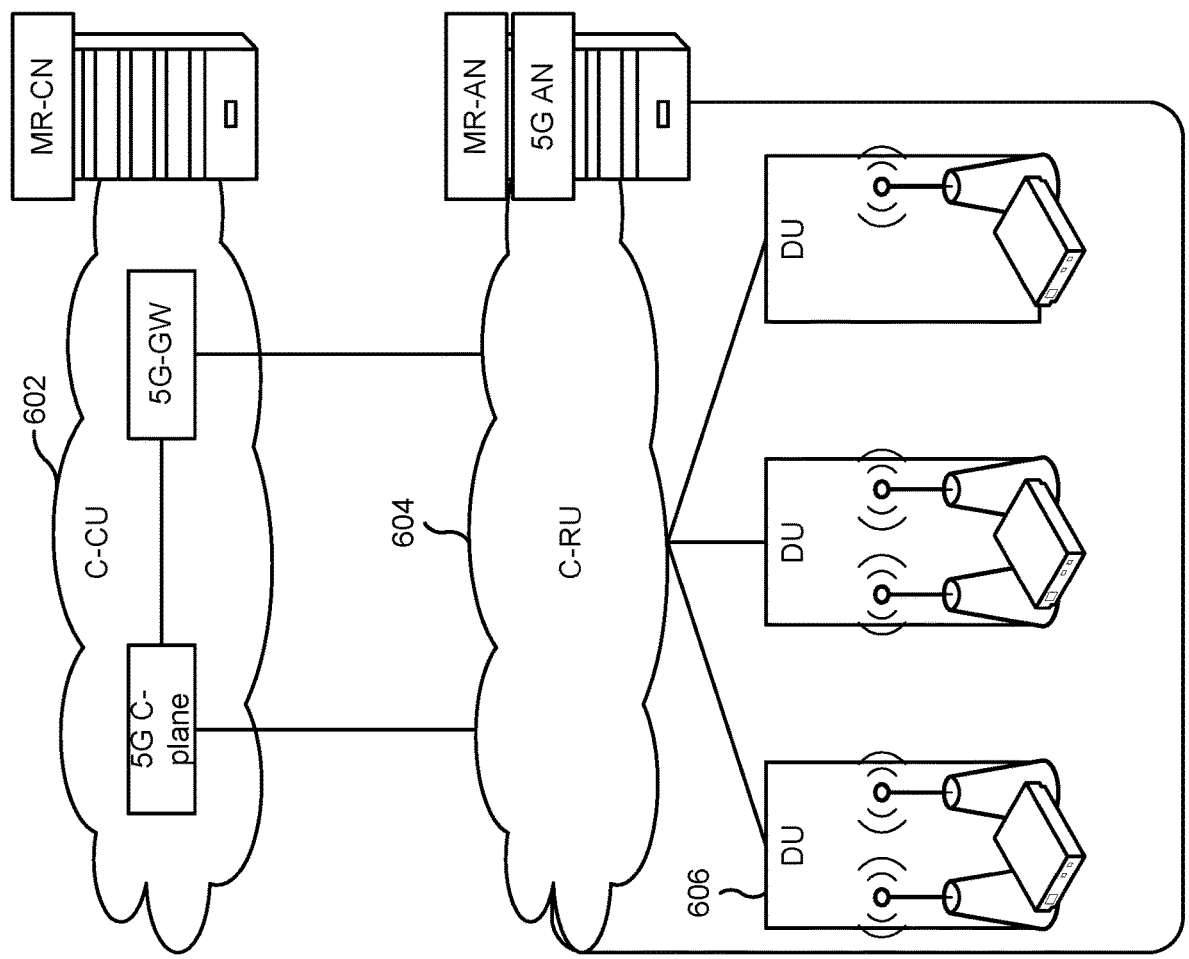
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

Figure 7:
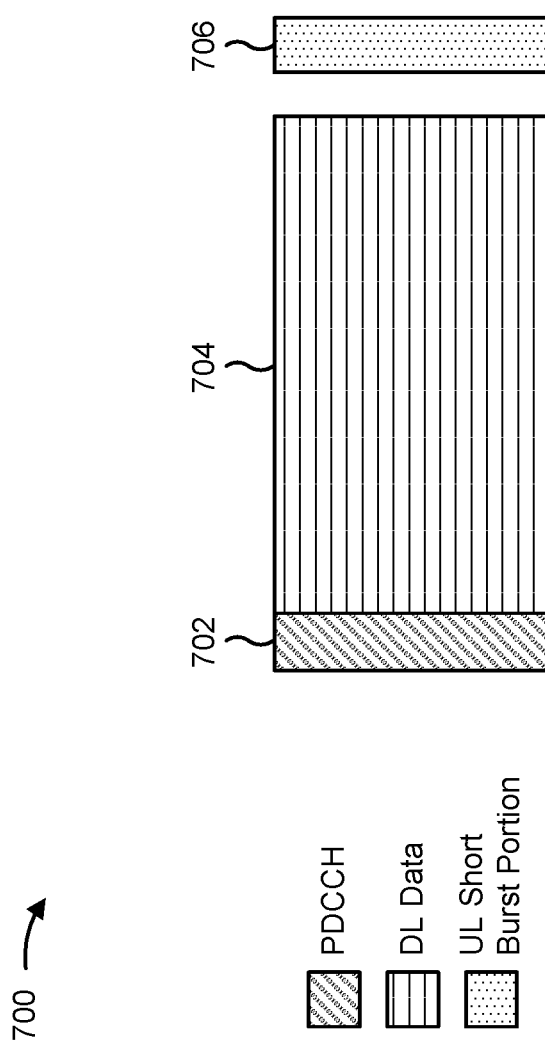
FIG. 7 is a diagram illustrating an example of a downlink (DL)-centric slot, in accordance with various aspects of the present disclosure.

FIG. 7 is a diagram 700 showing an example of a DL-centric slot or wireless communication structure. The DL-centric slot may include a control portion 702. The control portion 702 may exist in the initial or beginning portion of the DL-centric slot. The control portion 702 may include various scheduling information and/or control information corresponding to various portions of the DL-centric slot. In some configurations, the control portion 702 may be a physical DL control channel (PDCCH), as indicated in FIG. 7. In some aspects, the control portion 702 may include legacy PDCCH information, shortened PDCCH (sPDCCH) information), a control format indicator (CFI) value (e.g., carried on a physical control format indicator channel (PC-FICH)), one or more grants (e.g., downlink grants, uplink grants, and/or the like), and/or the like.

The DL-centric slot may also include a DL data portion 704. The DL data portion 704 may sometimes be referred to as the payload of the DL-centric slot. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric slot may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric slot. For example, the UL short burst portion 706 may include feedback information corresponding to the control portion 702 and/or the data portion 704. Non-limiting examples of information that may be included in the UL short burst portion 706 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples are possible and may differ from what was described with regard to FIG. 7.

Figure 8:
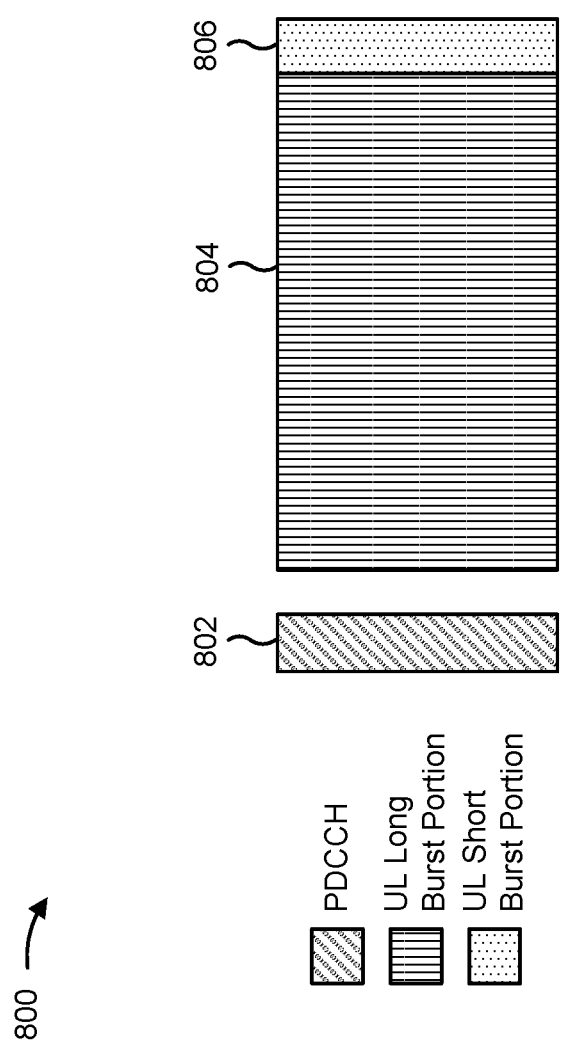
FIG. 8 is a diagram illustrating an example of an uplink (UL)-centric slot, in accordance with various aspects of the present disclosure.

FIG. 8 is a diagram 800 showing an example of an UL-centric slot or wireless communication structure. The UL-centric slot may include a control portion 802. The control portion 802 may exist in the initial or beginning portion of the UL-centric slot. The control portion 802 in FIG. 8 may be similar to the control portion 702 described above with reference to FIG. 7. The UL-centric slot may also include an UL long burst portion 804. The UL long burst portion 804 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 802 may be a physical DL control channel (PDCCH).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 806. The UL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 8 is provided merely as an example. Other examples are possible and may differ from what was described with regard to FIG. 8.

New radio (NR) supports multi-TRP operations. For example, the multi-TRP operations include the following for NR reception: 1) a single NR-physical downlink control channel (PDCCH) schedules a single NR-physical downlink shared channel (PDSCH) where separate layers are transmitted from separate TRPs (mode 1), and 2) multiple NR-PDCCHs each schedule a respective NR-PDSCH where each NR-PDSCH is transmitted from a separate TRP (mode 2).

For downlink, a maximum of 16 hybrid automatic repeat requests (HARQ) processes per cell is supported by a UE. In NR, a quantity of processes the UE may assume will at most be used for the downlink is configured to the UE for each cell separately by higher layer parameter nrofHARQ-processesForPDSCH. When no HARQ configuration is provided, a UE assumes a default quantity of eight processes. A base station is capable of configuring a different quantity of HARQ processes on different component carriers (CCs) for carrier aggregation (CA) operation.

When a UE is operating in a multi-TRP mode (e.g., mode 2) on a CC, there is no way to ensure that a total quantity of HARQ processes configured for the UE does not exceed a capability of the UE. In addition, there is currently no way for the UE to distinguish between different HARQ processes corresponding to different TRPs. Further, there is no coordination between TRPs with regard to the UE's capability for HARQ operation (e.g., particularly in non-ideal backhaul scenarios). These limitations degrade a performance of the UE.

Some techniques and apparatuses described herein provide for determining HARQ processes for multi-TRP. For example, some techniques and apparatuses described herein provide for determination of HARQ processes such that a total quantity of HARQ processes configured for a UE does not exceed a capability of the UE. In addition, and as another example, some techniques and apparatuses described herein provide a UE with a capability to distinguish between HARQ processes corresponding to different TRPs (e.g., for corresponding PDSCHs and/or PDCCHs), such that the UE can identify data associated with the different TRPs and/or to facilitate HARQ combining. This improves operations of a UE and/or HARQ configuration for a multi-TRP mode by conserving processing resources that would otherwise be consumed as a result of a HARQ configuration configuring a larger quantity of HARQ processes than the UE is capable of supporting, processing resources that would otherwise be consumed as a result of the UE not being capable of distinguishing between traffic associated with different TRPs, and/or the like.

Figure 9:
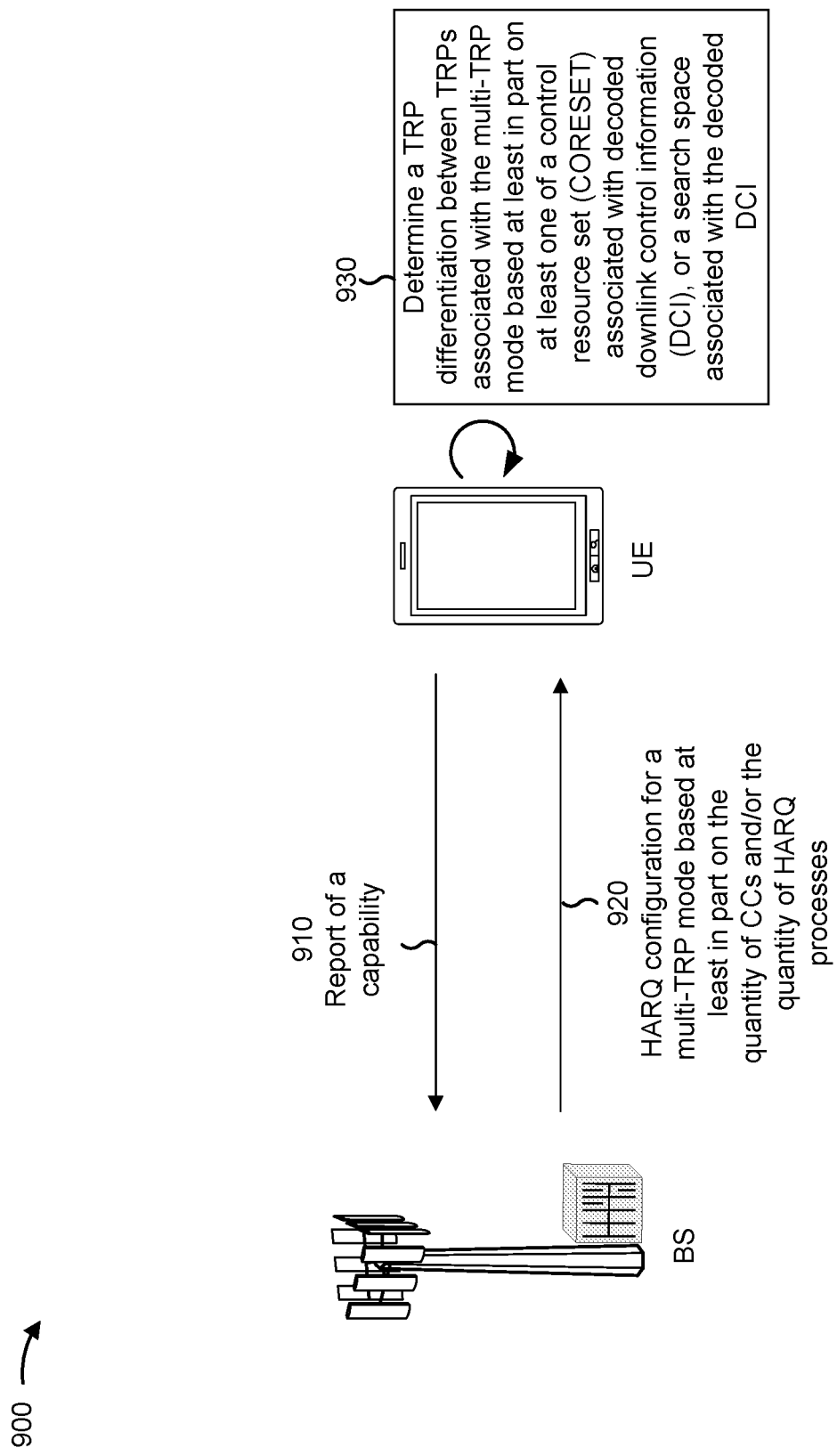
FIG. 9 is a diagram illustrating an example of determining hybrid automatic repeat request (HARQ) processes for multi-transmit receive point (TRP), in accordance with various aspects of the present disclosure.

FIG. 9 is a diagram illustrating an example 900 of determining HARQ processes for multi-TRP, in accordance with various aspects of the present disclosure. As shown in FIG. 9, example 900 includes a BS (e.g., BS 110) and a UE (e.g., UE 120).

As shown by reference number 910, the UE may transmit, and the BS may receive, a capability of the UE prior to receiving a HARQ configuration (e.g., the UE may report a capability of the UE). For example, the UE may report the capability based at least in part on receiving a request from the BS, based at least in part on attaching to the BS, based at least in part on establishing a connection to the BS, and/or the like. In some aspects, the capability of the UE may identify a quantity of CCs that the UE is capable of using, a quantity of HARQ processes that the UE is capable of using, and/or the like.

As shown by reference number 920, the BS may transmit, and the UE may receive, a HARQ configuration for a multi-TRP mode based at least in part on the quantity of CCs and/or the quantity of HARQ processes. For example, the UE may receive the HARQ configuration after reporting the capability to the BS, after the BS determines the HARQ configuration, and/or the like. In some aspects, separate HARQ processes may be associated with different TRPs (e.g., a different HARQ process may be associated with each TRP associated with a multi-TRP mode 2).

In some aspects, the HARQ configuration may be associated with configuring the UE to use a particular quantity of HARQ process. For example, the particular quantity of HARQ processes associated with the HARQ configuration may not exceed the capability of the UE based at least in part on the quantity of CCs reported by the UE. As a specific example, if a UE can support four CCs, then the HARQ configuration may configure the UE to use the four CCs with a single TRP, or to use two CCs of the four CCs with a first TRP and to use the other two CCs of the four CCs with a second TRP. In this way, a HARQ configuration may be based at least in part on a quantity of CCs reported by the UE and a quantity of HARQ processes per serving cell supported by the UE, such that a total quantity of HARQ processes does not exceed a capability of the UE.

As shown by reference number 930, the UE may determine a TRP differentiation between TRPs associated with the multi-TRP mode based at least in part on at least one of a CORESET associated with decoded DCI, or a search space associated with the decoded DCI. For example, the UE may determine the TRP differentiation after receiving the HARQ configuration, when receiving data associated with a HARQ process, and/or the like.

In some aspects, when determining the TRP differentiation, the UE may determine the TRP differentiation based at least in part on at least one of a CORESET identifier associated with the CORESET, or a search space identifier associated with the search space. For example, the UE may decode DCI in a search space and/or a CORESET, and may use a corresponding identifier for the search space and/or the CORESET to differentiate between TRPs associated with the multi-TRP mode (e.g., to differentiate between traffic from different TRPs). In some aspects, when different scrambling identifiers are needed for different PDSCHs, the UE may use the same CORESET identifier and/or search space identifier used for TRP differentiation for different scrambling initializations. For example, the UE may use different CORESET identifiers and/or different search space identifiers as different scrambling identifiers for different scrambling initializations. In this way, the UE may differentiate between different TRPs associated with a multi-TRP mode.

As indicated above, FIG. 9 is provided as an example. Other examples are possible and may differ from what was described with respect to FIG. 9.

Figure 10:
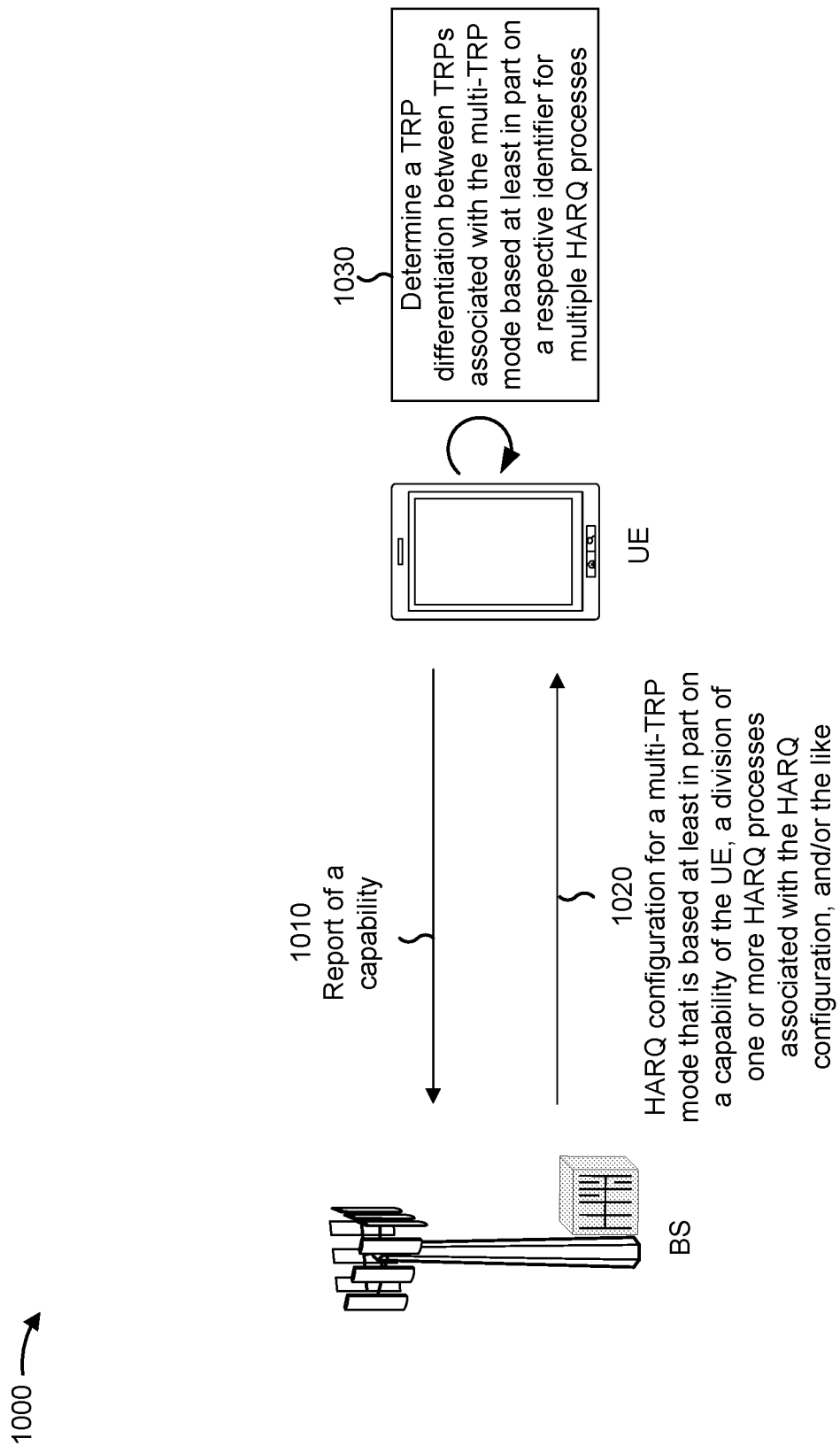
FIG. 10 is a diagram illustrating an example of determining HARQ processes for multi-TRP, in accordance with various aspects of the present disclosure.

FIG. 10 is a diagram illustrating an example 1000 of determining HARQ processes for multi-transmit reception point (TRP), in accordance with various aspects of the present disclosure. As shown in FIG. 10, example 1000 includes a BS (e.g., BS 110) and a UE (e.g., UE 120).

As shown by reference number 1010, the UE may transmit, and the BS may receive, a capability of the UE to the BS prior to receiving the HARQ configuration (e.g., the UE may report a capability of the UE). For example, the UE may report the capability based at least in part on receiving a request from the BS, based at least in part on attaching to the BS, based at least in part on establishing a connection to the BS, and/or the like. In some aspects, the capability of the UE identifies a quantity of CCs that the UE is capable of using, a quantity of HARQ processes that the UE is capable of using, and/or the like.

As shown by reference number 1020, the BS may transmit, and the UE may receive, a HARQ configuration for a multi-TRP mode that is based at least in part on a capability of the UE, a division of one or more HARQ processes associated with the HARQ configuration (e.g., across one or more CCs and/or one or more TRPs associated with the multi-TRP mode), and/or the like. In some aspects, the UE may receive the HARQ configuration after reporting the capability to the BS, after the BS determines the HARQ configuration, and/or the like.

In some aspects, a quantity of HARQ processes included in one or more HARQ processes associated with the HARQ configuration may not exceed the capability of the UE. For example, the quantity of HARQ processes may be divided across CCs and TRPs such that the quantity of HARQ processes is within the capability of the UE. In some aspects, one or more CCs may be associated with a single TRP. Additionally, or alternatively, multiple CCs may be associated with multiple TRPs with partitioning or may be associated with the multiple TRPs without partitioning. For example, if the UE can support four CCs, then the UE may be configured with four CCs for a single TRP. Alternatively, and continuing with the previous example, the UE may be configured with four CCs across two TRPs with HARQ partitioning, or two CCs with each of two TRPs without HARQ partitioning.

In some aspects, and with regard to HARQ partitioning, division of the HARQ processes may include a division of the HARQ processes between multiple TRPs. For example, HARQ processes may be divided between two TRPs, where a first TRP uses the first eight HARQ processes (e.g., a first group of HARQ processes), and a second TRP uses any remaining HARQ processes. In some aspects, partitioning of HARQ processes may be included in a radio resource control (RRC) signaling, a media access control control element (MAC CE) signaling, and/or the like.

As shown by reference number 1030, the UE may determine a TRP differentiation between TRPs associated with the multi-TRP mode based at least in part on a respective identifier for multiple HARQ processes associated with the HARQ configuration. For example, the UE may determine the TRP differentiation after receiving the HARQ configuration.

In some aspects, the UE may use a HARQ process identifier to identify a TRP with which the HARQ process is associated. For example, and as described above, different groups of HARQ processes may be associated with different TRPs, and the HARQ process identifier may identify a group of HARQ processes (and corresponding TRP) with which a particular HARQ process is associated. In some aspects, when different scrambling identifiers are needed, the UE may use different scrambling identifiers for different scrambling initializations, where different scrambling initializations are used for different groups of HARQ processes. For example, a first group of HARQ processes (e.g., associated with a first TRP) may be associated with a first scrambling initialization and a first scrambling identifier, and a second group of HARQ processes (e.g., associated with a second TRP) may be associated with a second scrambling initialization and a second scrambling identifier. In this way, the UE may use different scrambling identifiers.

As indicated above, FIG. 10 is provided as an example. Other examples are possible and may differ from what was described with respect to FIG. 10.

Figure 11:
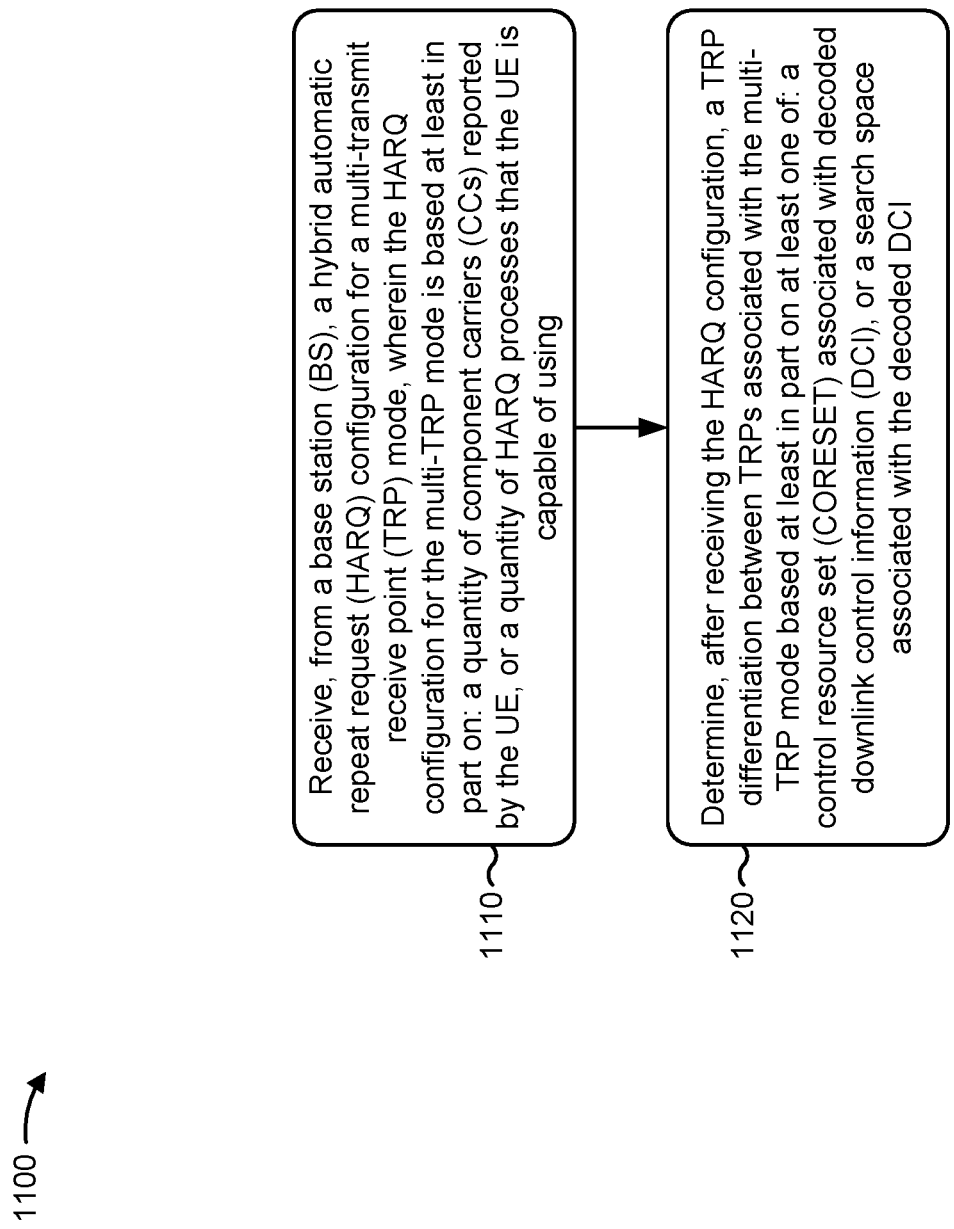
FIG. 11 is a diagram illustrating an example process performed, for example, by a user equipment, in accordance with various aspects of the present disclosure.

FIG. 11 is a diagram illustrating an example process 1100 performed, for example, by a UE, in accordance with various aspects of the present disclosure. Example process 1100 is an example where a UE (e.g., UE 120) performs determination of HARQ processes for multi-transmit reception point (TRP).

As shown in FIG. 11, in some aspects, process 1100 may include receiving, from a BS, a HARQ configuration for a multi-TRP mode, wherein the HARQ configuration for the multi-TRP mode is based at least in part on: a quantity of CCs reported by the UE, or a quantity of HARQ processes that the UE is capable of using (block 1110). For example, the UE (e.g., UE 120 using antenna 252, DEMOD 254, MIMO detector 256, receive processor 258, controller/processor 280, and/or the like) may receive, from a BS, a HARQ configuration for a multi-TRP mode, in a manner that is the same as or similar to that described elsewhere herein. In some implementations, the HARQ configuration for the multi-TRP mode is based at least in part on: a quantity of CCs reported by the UE, or a quantity of HARQ processes that the UE is capable of using.

As further shown in FIG. 11, in some aspects, process 1100 may include determining, after receiving the HARQ configuration, a TRP differentiation between TRPs associated with the multi-TRP mode based at least in part on at least one of: a CORESET associated with decoded DCI, or a search space associated with the decoded DCI (block 1120). For example, the UE (e.g., UE 120 using controller/processor 280 and/or the like) may determine, after receiving the HARQ configuration, a TRP differentiation between TRPs associated with the multi-TRP mode based at least in part on at least one of: a CORESET associated with decoded DCI, or a search space associated with the decoded DCI, in a manner that is the same as or similar to that described elsewhere herein.

Process 1100 may include additional aspects, such as any single aspect or any combination of aspects described below and/or in connection with one or more other processes described elsewhere herein.

In a first aspect, the UE may report a capability of the UE to the BS prior to receiving the HARQ configuration, wherein the capability of the UE identifies the quantity of CCs or the quantity of HARQ processes.

In a second aspect, alone or in combination with the first aspect, the quantity of HARQ processes associated with the HARQ configuration does not exceed a capability of the UE based at least in part on the quantity of CCs.

In a third aspect, alone or in combination with one or more of the first and second aspects, the UE may determine the TRP differentiation based at least in part on at least one of: a CORESET identifier associated with the CORESET, or a search space identifier associated with the search space.

In a fourth aspect, alone or in combination with one or more of the first through third aspects, different CORESET identifiers or different search space identifiers are used as different scrambling identifiers for different scrambling initializations.

Although FIG. 1100 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
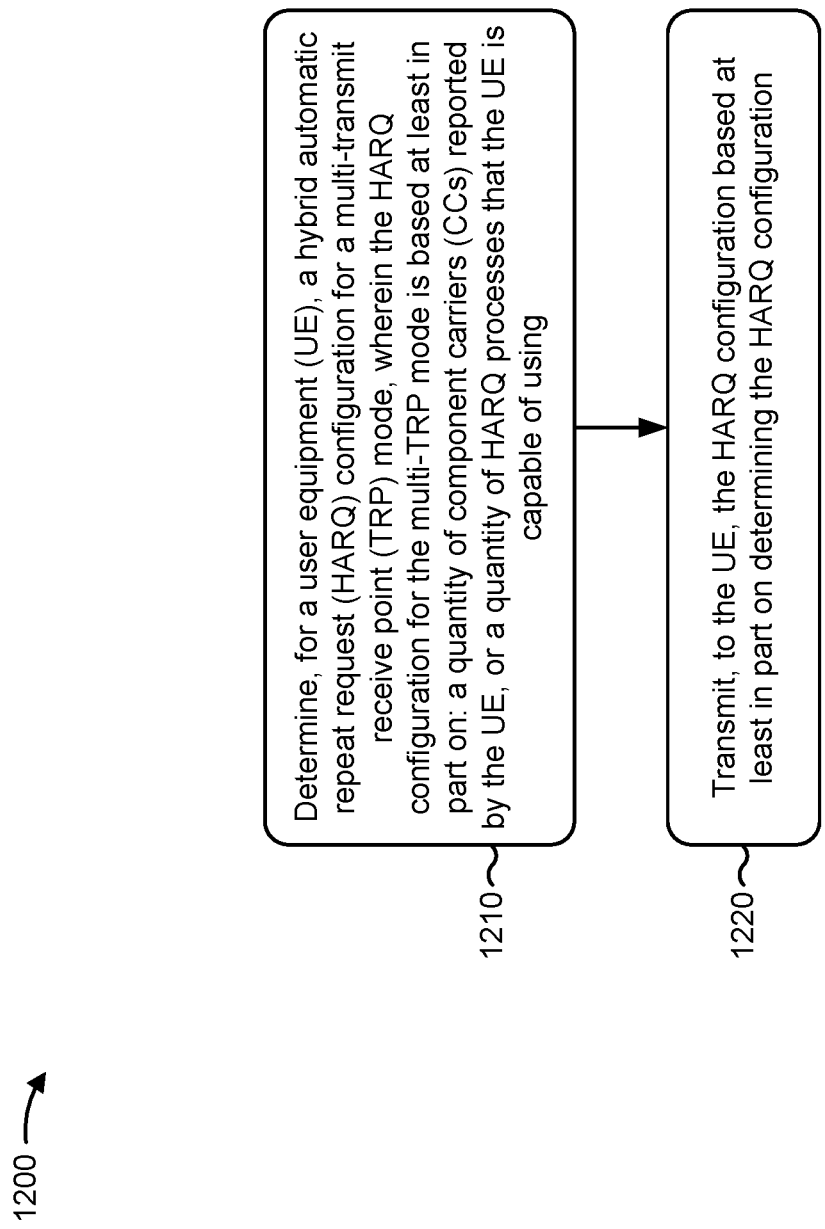
FIG. 12 is a diagram illustrating an example process performed, for example, by a base station, in accordance with various aspects of the present disclosure.

FIG. 12 is a diagram illustrating an example process 1200 performed, for example, by a BS, in accordance with various aspects of the present disclosure. Example process 1200 is an example where a BS (e.g., BS 110) performs determination of HARQ processes for multi-TRP.

As shown in FIG. 12, in some aspects, process 1200 may include determining, for a UE, a HARQ configuration for a multi-TRP mode, wherein the HARQ configuration for the multi-TRP mode is based at least in part on: a quantity of CCs reported by the UE, or a quantity of HARQ processes that the UE is capable of using (block 1210). For example, the BS (e.g., BS 110 using controller/processor 240 and/or the like) may determine, for a UE, a HARQ configuration for a multi-TRP mode, in a manner that is the same as or similar to that described elsewhere herein. In some aspects, the HARQ configuration for the multi-TRP mode is based at least in part on: a quantity of CCs reported by the UE, or a quantity of HARQ processes that the UE is capable of using.

As further shown in FIG. 12, in some aspects, process 1200 may include transmitting, to the UE, the HARQ configuration based at least in part on determining the HARQ configuration (block 1220). For example, the BS (e.g., BS 110 using controller/processor 240, transmit processor 220, TX MIMO processor 230, MOD 232, antenna 234, and/or the like) may transmit, to the UE, the HARQ configuration based at least in part on determining the HARQ configuration, in a manner that is the same as or similar to that described elsewhere herein.

Process 1200 may include additional aspects, such as any single aspect or any combination of aspects described below and/or in connection with one or more other processes described elsewhere herein.

In a first aspect, the BS may receive a reporting of a capability of the UE prior to determining the HARQ configuration, wherein the capability of the UE identifies the quantity of CCs or the quantity of HARQ processes.

In a second aspect, alone or in combination with the first aspect, the quantity of HARQ processes associated with the HARQ configuration does not exceed a capability of the UE based at least in part on the quantity of CCs.

In a third aspect, alone or in combination with one or more of the first and second aspects, a TRP differentiation between TRPs associated with the multi-TRP mode is based at least in part on at least one of: a CORESET identifier associated with a CORESET associated with decoded DCI, or a search space identifier associated with a search space associated with the decoded DCI.

In a fourth aspect, alone or in combination with one or more of the first through third aspects, different CORESET identifiers or different search space identifiers are used as different scrambling identifiers for different scrambling initializations.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
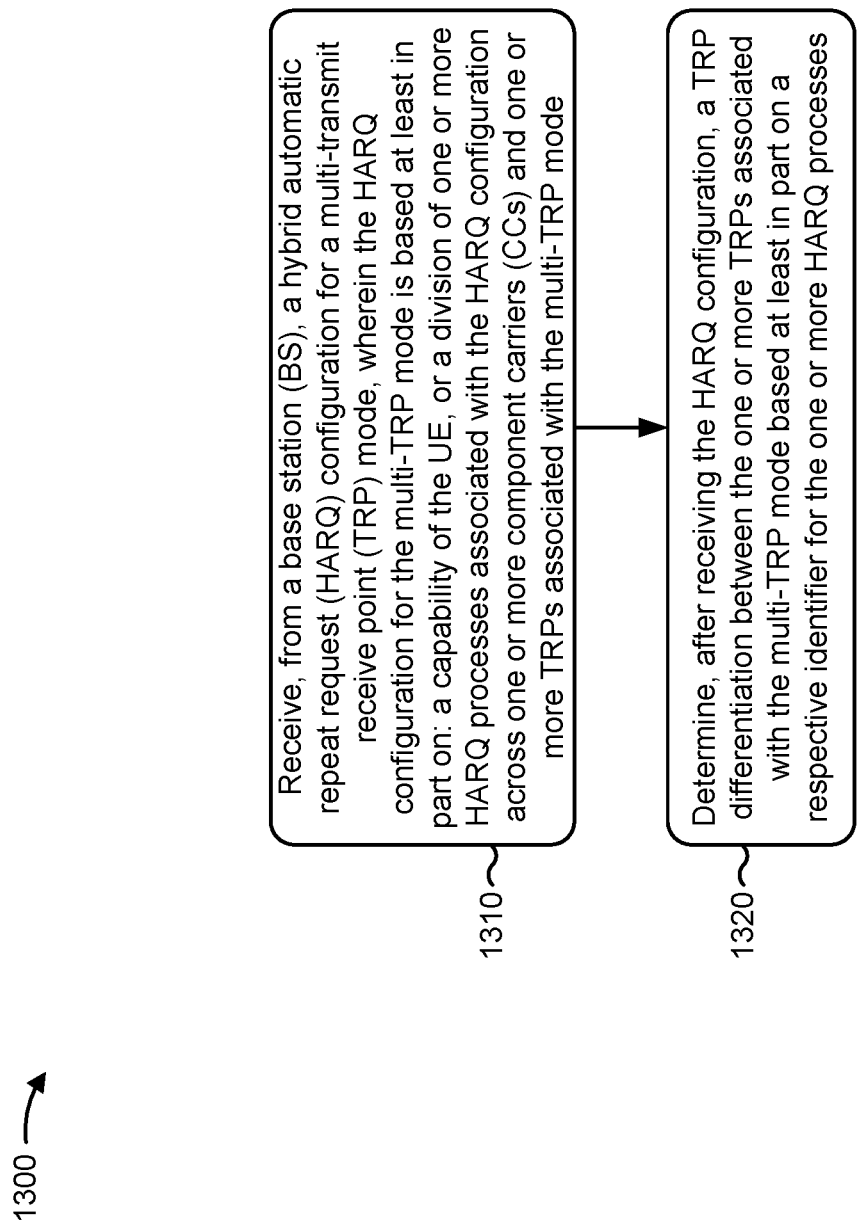
FIG. 13 is a diagram illustrating an example process performed, for example, by a user equipment, in accordance with various aspects of the present disclosure.

FIG. 13 is a diagram illustrating an example process 1300 performed, for example, by a UE, in accordance with various aspects of the present disclosure. Example process 1300 is an example where a UE (e.g., UE 120) performs determination of HARQ processes for multi-TRP.

As shown in FIG. 13, in some aspects, process 1300 may include receiving, from a B S, a HARQ configuration for a multi-TRP mode, wherein the HARQ configuration for the multi-TRP mode is based at least in part on: a capability of the UE, or a division of one or more HARQ processes associated with the HARQ configuration across one or more CCs and one or more TRPs associated with the multi-TRP mode (block 1310). For example, the UE (e.g., UE 120 using antenna 252, DEMOD 254, MIMO detector 256, receive processor 258, controller/processor 280, and/or the like) may receive, from a B S, a HARQ configuration for a multi-TRP mode, in a manner that is the same as or similar to that described elsewhere herein. In some aspects, the HARQ configuration for the multi-TRP mode is based at least in part on: a capability of the UE, or a division of one or more HARQ processes associated with the HARQ configuration across one or more CCs and one or more TRPs associated with the multi-TRP mode.

As further shown in FIG. 13, in some aspects, process 1300 may include determining, after receiving the HARQ configuration, a TRP differentiation between the one or more TRPs associated with the multi-TRP mode based at least in part on a respective identifier for the one or more HARQ processes (block 1320). For example, the UE (e.g., UE 120 using controller/processor 280 and/or the like) may determine, after receiving the HARQ configuration, a TRP differentiation between the one or more TRPs associated with the multi-TRP mode based at least in part on a respective identifier for the one or more HARQ processes, in a manner that is the same as or similar to that described elsewhere herein.

Process 1300 may include additional aspects, such as any single aspect or any combination of aspects described below and/or in connection with one or more other processes described elsewhere herein.

In a first aspect, the UE may report the capability of the UE to the BS prior to receiving the HARQ configuration, wherein the capability identifies at least one of: a quantity of CCs associated with the UE, or a quantity of HARQ processes that the UE is capable of using.

In a second aspect, alone or in combination with the first aspect, a quantity of HARQ processes included in the one or more HARQ processes does not exceed the capability of the UE.

In a third aspect, alone or in combination with one or more of the first and second aspects, the one or more CCs are associated with a single TRP of the one or more TRPs, or wherein the one or more CCs includes multiple CCs associated with multiple TRPs, of the one or more TRPs, with partitioning or the multiple TRPs without partitioning.

In a fourth aspect, alone or in combination with one or more of the first through third aspects, the division of the one or more HARQ processes across the one or more CCs and the one or more TRPs with the partitioning includes the division of multiple HARQ processes, of the one or more HARQ processes, between the multiple TRPs, wherein a first group of the multiple HARQ processes includes eight HARQ processes associated with a first TRP of the multiple TRPs, and wherein a second group of the multiple HARQ processes includes any remaining HARQ processes associated with a second TRP of the multiple TRPs.

In a fifth aspect, alone or in combination with one or more of the first through fourth aspects, the partitioning is indicated in at least one of: a radio resource control (RRC) signaling, or a MAC CE signaling.

In a sixth aspect, alone or in combination with one or more of the first through fifth aspects, the UE may determine the TRP differentiation based at least in part on a respective HARQ process identifier associated with the multiple HARQ processes, wherein the respective HARQ process identifier identifies a respective TRP identifier of the multiple TRPs associated with the multiple HARQ processes.

In a seventh aspect, alone or in combination with one or more of the first through sixth aspects, different scrambling identifiers for different scrambling initializations are used for the first group of the multiple HARQ processes and the second group of the multiple HARQ processes.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
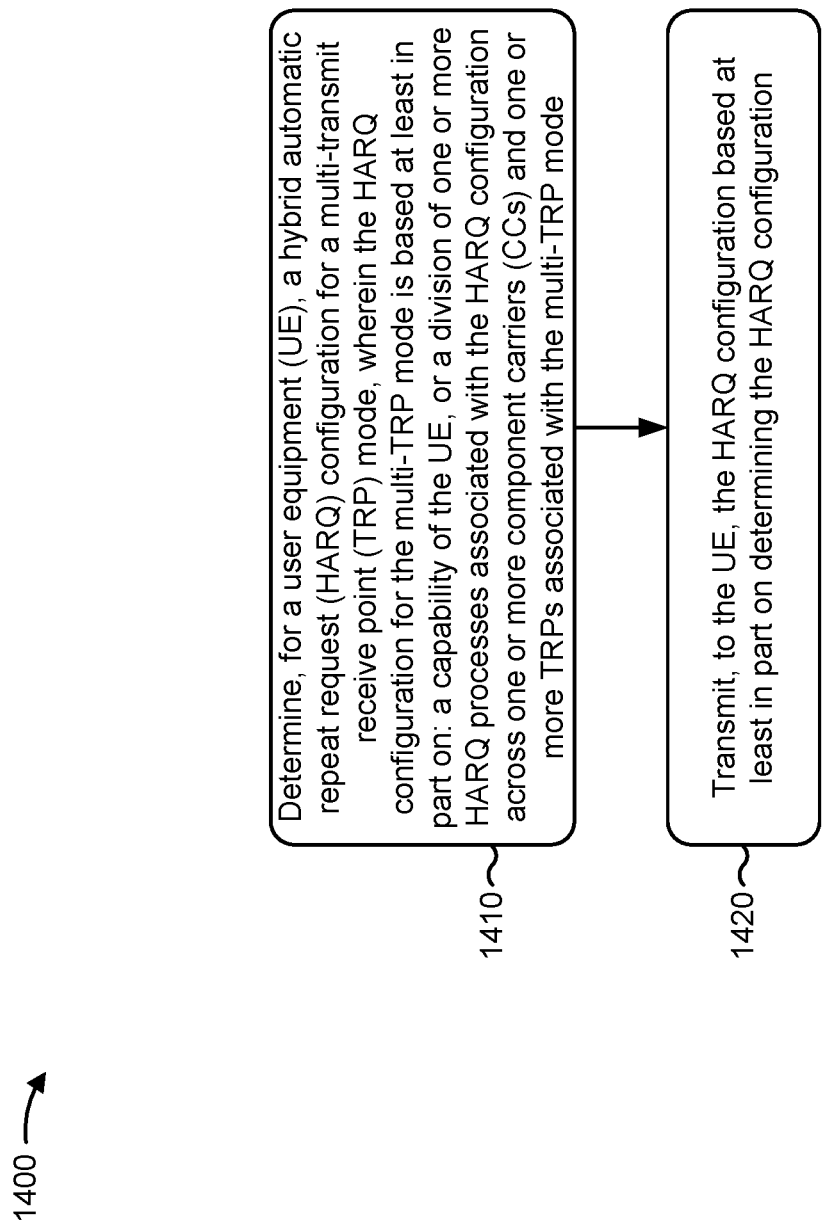
FIG. 14 is a diagram illustrating an example process performed, for example, by a base station, in accordance with various aspects of the present disclosure.

FIG. 14 is a diagram illustrating an example process 1400 performed, for example, by a UE, in accordance with various aspects of the present disclosure. Example process 1400 is an example where a BS (e.g., BS 110) performs determination of HARQ processes for multi-TRP.

As shown in FIG. 14, in some aspects, process 1400 may include determining, for a UE, a HARQ configuration for a multi-TRP mode, wherein the HARQ configuration for the multi-TRP mode is based at least in part on: a capability of the UE, or a division of one or more HARQ processes associated with the HARQ configuration across one or more CCs and one or more TRPs associated with the multi-TRP mode (block 1410). For example, the BS (e.g., BS 110 using controller/processor 240 and/or the like) may determine, for a UE, a HARQ configuration for a multi-TRP mode, in a manner that is the same as or similar to that described elsewhere herein. In some aspects, the HARQ configuration for the multi-TRP mode is based at least in part on: a capability of the UE, or a division of one or more HARQ processes associated with the HARQ configuration across one or more CCs and one or more TRPs associated with the multi-TRP mode.

As further shown in FIG. 14, in some aspects, process 1400 may include transmitting, to the UE, the HARQ configuration based at least in part on determining the HARQ configuration (block 1420). For example, the BS (e.g., BS 110 using controller/processor 240, transmit processor 220, TX MIMO processor 230, MOD 232, antenna 234, and/or the like) may transmit, to the UE, the HARQ configuration based at least in part on determining the HARQ configuration, in a manner that is the same as or similar to that described elsewhere herein.

Process 1400 may include additional aspects, such as any single aspect or any combination of aspects described below and/or in connection with one or more other processes described elsewhere herein.

In a first aspect, the BS may receive, from the UE, a reporting of the capability of the UE prior to determining the HARQ configuration, wherein the reporting of the capability identifies at least one of: a quantity of CCs associated with the UE, or a quantity of HARQ processes that the UE is capable of using.

In a second aspect, alone or in combination with the first aspect, a quantity of HARQ processes included in the one or more HARQ processes does not exceed the capability of the UE.

In a third aspect, alone or in combination with one or more of the first and second aspects, the one or more CCs are associated with a single TRP of the one or more TRPs, or wherein the one or more CCs includes multiple CCs associated with multiple TRPs, of the one or more TRPs, with partitioning or the multiple TRPs without partitioning.

In a fourth aspect, alone or in combination with one or more of the first through third aspects, the division of the one or more HARQ processes across the one or more CCs and the one or more TRPs with the partitioning includes the division of multiple HARQ processes, of the one or more HARQ processes, between the multiple TRPs, wherein a first group of the multiple HARQ processes includes eight HARQ processes associated with a first TRP of the multiple TRPs, and wherein a second group of the multiple HARQ processes includes any remaining HARQ processes associated with a second TRP of the multiple TRPs.

In a fifth aspect, alone or in combination with one or more of the first through fourth aspects, the partitioning is indicated in at least one of: a radio resource control (RRC) signaling, or a MAC CE signaling.

In a sixth aspect, alone or in combination with one or more of the first through fifth aspects, a TRP differentiation between the one or more TRPs associated with the multi-TRP mode is based at least in part on a respective HARQ process identifier associated with the multiple HARQ processes, wherein the respective HARQ process identifier identifies a respective TRP identifier of the multiple TRPs associated with the multiple HARQ processes.

In a seventh aspect, alone or in combination with one or more of the first through sixth aspects, different scrambling identifiers for different scrambling initializations are used for the first group of the multiple HARQ processes and the second group of the multiple HARQ processes.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

FIG. 15 is a diagram illustrating an example process 1500 performed, for example, by a UE, in accordance with various aspects of the present disclosure. Example process 1500 is an example where the UE (e.g., UE 120 and/or the like) performs operations associated with TRP differentiation.

As shown in FIG. 15, in some aspects, process 1500 may include determining a control resource set (CORESET) associated with decoded downlink control information (DCI) or a search space associated with the decoded DCI (block 1510). For example, the UE (e.g., using receive processor 258, transmit processor 264, controller/processor 280, memory 282, and/or the like) may determine a CORESET associated with decoded DCI or a search space associated with the decoded DCI, as described above.

As further shown in FIG. 15, in some aspects, process 1500 may include determining a transmit receive point (TRP) differentiation between TRPs associated with a multi-TRP mode based at least in part on the CORESET associated with the decoded DCI or the search space associated with the decoded DCI (block 1520). For example, the UE (e.g., using receive processor 258, transmit processor 264, controller/processor 280, memory 282, and/or the like) may determine a TRP differentiation between TRPs associated with a multi-TRP mode based at least in part on the CORESET associated with the decoded DCI or the search space associated with the decoded DCI, as described above.

Process 1500 may include additional aspects, such as any single aspect or any combination of aspects described below and/or in connection with one or more other processes described elsewhere herein.

In a first aspect, process 1500 includes receiving, from a base station (BS), a hybrid automatic repeat request (HARQ) configuration for the multi-TRP mode, wherein the HARQ configuration for the multi-TRP mode is based at least in part on at least one of a quantity of component carriers (CCs) reported by the UE or a quantity of HARQ processes that the UE is capable of using; and determining the TRP differentiation after receiving the HARQ configuration.

In a second aspect, alone or in combination with the first aspect, process 1500 includes reporting a capability of the UE to the BS prior to receiving the HARQ configuration, wherein the capability of the UE identifies the quantity of CCs or the quantity of HARQ processes.

In a third aspect, alone or in combination with one or more of the first and second aspects, the quantity of HARQ processes associated with the HARQ configuration does not exceed a capability of the UE based at least in part on the quantity of CCs.

In a fourth aspect, alone or in combination with one or more of the first through third aspects, determining the TRP differentiation comprises determining the TRP differentiation based at least in part on at least one of a CORESET identifier associated with the CORESET or a search space identifier associated with the search space.

In a fifth aspect, alone or in combination with one or more of the first through fourth aspects, different CORESET identifiers or different search space identifiers are used as different scrambling identifiers for different scrambling initializations.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining a control resource set (CORESET) associated with decoded downlink control information (DCI) or a search space associated with the decoded DCI; and
   determining a transmit receive point (TRP) differentiation between TRPs associated with a multi-TRP mode based at least in part on the CORESET associated with the decoded DCI or the search space associated with the decoded DCI.

2. The method of claim 1, further comprising receiving, from a base station (BS), a hybrid automatic repeat request (HARQ) configuration for the multi-TRP mode, wherein the HARQ configuration for the multi-TRP mode is based at least in part on at least one of a quantity of component carriers (CCs) reported by the UE or a quantity of HARQ processes that the UE uses; and
   determining the TRP differentiation after receiving the HARQ configuration.

3. The method of claim 2, further comprising reporting a capability of the UE to the BS prior to receiving the HARQ configuration, wherein the capability of the UE identifies the quantity of CCs or the quantity of HARQ processes.

4. The method of claim 2, wherein the quantity of HARQ processes associated with the HARQ configuration does not exceed a capability of the UE based at least in part on the quantity of CCs.

5. The method of claim 1, wherein determining the TRP differentiation comprises determining the TRP differentiation based at least in part on at least one of a CORESET identifier associated with the CORESET or a search space identifier associated with the search space.

6. The method of claim 5, wherein different CORESET identifiers or different search space identifiers are used as different scrambling identifiers for different scrambling initializations.

7. A method of wireless communication performed by a base station (BS), comprising:
  determining, for a user equipment (UE), a hybrid automatic repeat request (HARQ) configuration for a multi-transmit receive point (TRP) mode, wherein the HARQ configuration for the multi-TRP mode is based at least in part on at least one of a quantity of component carriers (CCs) reported by the UE or a quantity of HARQ processes that the UE uses; and
  transmitting, to the UE, the HARQ configuration based at least in part on determining the HARQ configuration.

8. The method of claim 7, further comprising:
  receiving a reporting of a capability of the UE prior to determining the HARQ configuration,
    wherein the capability of the UE identifies the quantity of CCs or the quantity of HARQ processes.

9. The method of claim 7, wherein the quantity of HARQ processes associated with the HARQ configuration does not exceed a capability of the UE based at least in part on the quantity of CCs.

10. The method of claim 7, wherein a TRP differentiation between TRPs associated with the multi-TRP mode is based at least in part on at least one of:
  a control resource set (CORESET) identifier associated with a CORESET associated with decoded downlink control information (DCI), or
  a search space identifier associated with a search space associated with the decoded DCI.

11. The method of claim 10, wherein different CORESET identifiers or different search space identifiers are used as different scrambling identifiers for different scrambling initializations.

12. A method of wireless communication performed by a user equipment (UE), comprising:
  receiving, from a base station (BS), a hybrid automatic repeat request (HARQ) configuration for a multi-transmit receive point (TRP) mode, wherein the HARQ configuration for the multi-TRP mode is based at least in part on at least one of a capability of the UE or a division of one or more HARQ processes associated with the HARQ configuration across one or more component carriers (CCs) and one or more TRPs associated with the multi-TRP mode; and
  determining, after receiving the HARQ configuration, a TRP differentiation between the one or more TRPs associated with the multi-TRP mode based at least in part on a respective identifier for the one or more HARQ processes.

13. The method of claim 12, further comprising reporting the capability of the UE to the BS prior to receiving the HARQ configuration, wherein the capability identifies at least one of a quantity of CCs associated with the UE or a quantity of HARQ processes that the UE uses.

14. The method of claim 12, wherein a quantity of HARQ processes included in the one or more HARQ processes does not exceed the capability of the UE.

15. The method of claim 12, wherein the one or more CCs are associated with a single TRP of the one or more TRPs, or
  wherein the one or more CCs includes multiple CCs associated with multiple TRPs, of the one or more TRPs, with partitioning or the multiple TRPs without partitioning.

16. The method of claim 15, wherein the division of the one or more HARQ processes across the one or more CCs and the one or more TRPs with the partitioning includes a division of multiple HARQ processes, of the one or more HARQ processes, between multiple TRPs of the one or more TRPs,
  wherein a first group of the multiple HARQ processes includes eight HARQ processes associated with a first TRP of the multiple TRPs, and
  wherein a second group of the multiple HARQ processes includes any remaining HARQ processes associated with a second TRP of the multiple TRPs.

17. The method of claim 16, wherein the partitioning is indicated in at least one of:
  a radio resource control (RRC) signaling, or
  a media access control element (MAC CE) signaling.

18. The method of claim 16, wherein determining the TRP differentiation comprises:
  determining the TRP differentiation based at least in part on a respective HARQ process identifier associated with the multiple HARQ processes,
    wherein the respective HARQ process identifier identifies a respective TRP identifier of the multiple TRPs associated with the multiple HARQ processes.

19. The method of claim 16, wherein different scrambling identifiers for different scrambling initializations are used for the first group of the multiple HARQ processes and the second group of the multiple HARQ processes.

20. A method of wireless communication performed by a base station (BS), comprising:
  determining, for a user equipment (UE), a hybrid automatic repeat request (HARQ) configuration for a multi-transmit receive point (TRP) mode,
    wherein the HARQ configuration for the multi-TRP mode is based at least in part on:
      a capability of the UE, or
      a division of one or more HARQ processes associated with the HARQ configuration across one or more component carriers (CCs) and one or more TRPs associated with the multi-TRP mode; and
  transmitting, to the UE, the HARQ configuration based at least in part on determining the HARQ configuration.

21. The method of claim 20, further comprising:
  receiving, from the UE, a reporting of the capability of the UE prior to determining the HARQ configuration,
    wherein the reporting of the capability identifies at least one of:
      a quantity of CCs associated with the UE, or
      a quantity of HARQ processes that the UE uses.

22. The method of claim 20, wherein a quantity of HARQ processes included in the one or more HARQ processes does not exceed the capability of the UE.

23. The method of claim 20, wherein the one or more CCs are associated with a single TRP of the one or more TRPs, or wherein the one or more CCs includes multiple CCs associated with multiple TRPs, of the one or more TRPs, with partitioning or the multiple TRPs without partitioning.

24. The method of claim 23, wherein the division of the one or more HARQ processes across the one or more CCs and the one or more TRPs with the partitioning includes a division of multiple HARQ processes, of the one or more HARQ processes, between multiple TRPs of the one or more TRPs,
- wherein a first group of the multiple HARQ processes includes eight HARQ processes associated with a first TRP of the multiple TRPs, and
- wherein a second group of the multiple HARQ processes includes any remaining HARQ processes associated with a second TRP of the multiple TRPs.

25. The method of claim 24, wherein the partitioning is indicated in at least one of:
- a radio resource control (RRC) signaling, or
- a media access control control element (MAC CE) signaling.

26. The method of claim 24, wherein a TRP differentiation between the one or more TRPs associated with the multi-TRP mode is based at least in part on a respective HARQ process identifier associated with the multiple HARQ processes,
- wherein the respective HARQ process identifier identifies a respective TRP identifier of the multiple TRPs associated with the multiple HARQ processes.

27. The method of claim 24, wherein different scrambling identifiers for different scrambling initializations are used for the first group of the multiple HARQ processes and the second group of the multiple HARQ processes.

* * * * *